United States Patent [19]

Sanders et al.

[11] Patent Number: 5,563,879
[45] Date of Patent: Oct. 8, 1996

[54] METHOD OF RECONSTRUCTING AND DELIVERING SEGMENTED MESSAGES

[75] Inventors: Bradley T. Sanders, Chandler; Donald J. Sabourin, Mesa; Kenneth W. Hines, Tempe; Vijay K. Kapoor, Phoenix; David S. Saewert, Mesa; James A. Stephens, Chandler, all of Ariz.

[73] Assignee: Motorola, Inc., Schaumburg, Ill.

[21] Appl. No.: 566,412

[22] Filed: Dec. 1, 1995

Related U.S. Application Data

[63] Continuation of Ser. No. 300,546, Sep. 6, 1994, abandoned.
[51] Int. Cl.$^6$ ........................................................ H04J 3/24
[52] U.S. Cl. ........................................................ 370/60; 370/94.1
[58] Field of Search ...................... 370/13, 13.1, 54, 370/55, 56, 58.1, 58.2, 58.3, 60, 60.1, 61, 79, 82, 83, 94.1, 94.2, 99

[56] References Cited

U.S. PATENT DOCUMENTS

| | | | |
|---|---|---|---|
| 4,703,475 | 10/1987 | Dretzka et al. | 370/60 |
| 5,050,166 | 9/1991 | Cantoni et al. | 370/94.1 |
| 5,128,929 | 7/1992 | Kobayashi | 370/60 |
| 5,151,899 | 9/1992 | Thomas et al. | 370/94.1 |
| 5,168,497 | 12/1992 | Ozaki et al. | 370/94.1 |
| 5,224,092 | 6/1993 | Brandt | 370/94.1 |
| 5,337,313 | 8/1994 | Buchholz et al. | 370/94.1 |

*Primary Examiner*—Alpus H. Hsu
*Attorney, Agent, or Firm*—Harold C. McGurk

[57] ABSTRACT

A method (50) reconstructs messages from segments (30) which are received in an unknown order and at different times. Each segment (30) comprises a header (31) and payload information (38). The method (50) reconstructs messages from the received segments (30) by reassembling the order as specified in the header (31) of the segment (30). Once the message is reconstructed, the message is delivered. This method (50) is especially important in satellite-based communications where no guarantee exists that the messages will be received in a sequential order or at a specified time.

11 Claims, 4 Drawing Sheets

METHOD OF RECONSTRUCTING AND DELIVERING SEGMENTED MESSAGES

This application is a continuation of prior application Ser. No. 08/300,546 filed Sep. 6, 1994 now abandoned.

RELATED INVENTIONS

This application is related to co-pending U.S. Pat. application Ser. No. 08/279,729 filed on Jul. 25, 1994, and entitled *Inter-satellite Method for Routing Packets*, which is assigned to the same assignee of the present application, now abandoned.

TECHNICAL FIELD

This invention relates generally to communication systems and, in particular, to a method for reconstructing messages from segments which are received at different times and possibly in a different order and delivering reconstructed messages from the received segments.

BACKGROUND OF THE INVENTION

Existing conventional methods or protocols in the public domain used for the transportation of data from an origination node to a destination node are designed for ground-based telecommunication systems and cannot be used without modification in satellite-based systems. Most ground-based methods rely on a physical wire which connects the nodes. This physical connection insures that data is received at the destination node in the same order in which it was transmitted from the source. This, however, is not true in a system comprised of a constellation of satellites moving with respect to each other and earth. Because of the continuously changing satellite constellation geography and physical routing paths, messages are divided into segments and transmitted through the continuously changing constellation of satellites. The individual segments of the message will be received in an unknown order and in a variable amount of time.

Accordingly, there is a significant need for a method of reconstructing messages from segments received in an unknown order and at different times before the reconstructed messages are reconstructed and delivered.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENTS

The present invention provide a method for the reliable transmission of messages from an origination node to a destination node. Briefly, the IRIDIUM® System comprises a constellation of satellites orbiting earth. The orbiting satellites are connected to public switched telephone networks (PSTN) via gateways, a number of individual subscriber units (ISUs) and a system control segment (SCS). This interconnected network provides world-wide paging and telephony services. Each entity in the system is a "node" and each node can generate a message to be sent to another node in the system. Packet switching techniques are used at the lowest layer of communications in the system. Because messages are variable in length and packets are fixed in length, it is necessary to segment messages into packets which are then transmitted node-to-node from the origination node through intervening nodes to the destination node. This method provides a reliable transmission of variable length messages between nodes.

A "satellite" means a man-made object or vehicle intended to orbit a celestial body such as the earth. The term "satellite" is intended to include both geostationary and orbiting satellites and/or combinations thereof including low-earth orbiting (LEO) satellites. The word "earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell" and "antenna pattern" are not intended to be limited to any particular mode of generation and include those created by either terrestrial or satellite cellular communication systems and/or combinations thereof.

Figure 1:
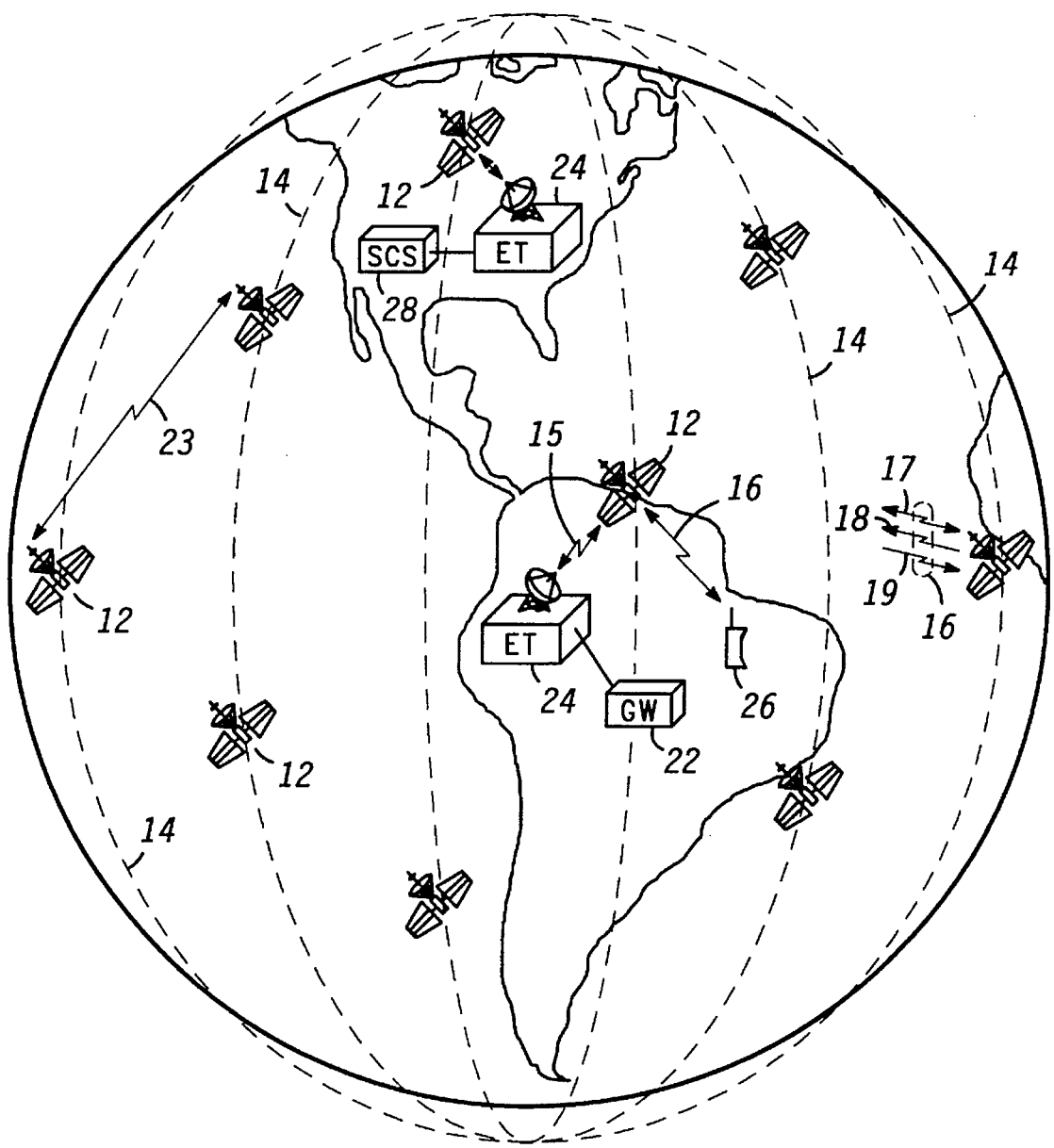
FIG. 1 depicts a highly simplified diagram of a satellite-based communication system of which the present invention may form a portion thereof.

FIG. 1 illustrates a highly simplified diagram of satellite-based communication system 10, dispersed over and surrounding earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles earth at an altitude of around 380 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or ISUs 26 for a period of approximately nine minutes.

Satellites 12 communicate with terrestrial stations which may include some number of radio communication individual subscriber units (ISUs) 26 and earth terminals (ETs) 24 connected to system control segment (SCS) 28. ETs 24 may also be connected to gateways (GWs) 22 which provide access to a public switched telephone network (PSTN) or other communications facilities. Only one each of GWs 22, SCSs 28 and ISUs 26 are shown in FIG. 1 for clarity and ease of understanding. ETs 24 may be co-located with or separate from SCS 28 or GW 22. ETs 24 associated with SCSs 28 receive data describing status of satellites 12 and GWs 22 and relay packets of control information. ETs 24 associated with GWs 22 primarily receive and relay packets relating to calls in progress from/to ISUs 26 and satellites 12.

ISUs 26 may be located anywhere on the surface of the earth or in the atmosphere above the earth. ISUs 26 are preferably communications devices capable of transmitting data to and receiving data from satellites 12. By way of example, ISUs 26 may be hand-held, portable cellular telephones adapted to communicate with satellites 12. Ordinarily, ISUs 26 need not perform any control functions for communication system 10.

Communication system 10 may accommodate any number, potentially in the millions, of ISUs 26. In the preferred embodiments of the present invention, ISUs 26 communicate with nearby satellites 12 via subscriber links 16. Links 16 encompass a limited portion of the electromagnetic spectrum that is divided into numerous channels. Links 16 are preferably combinations of L-Band and/or K-Band frequency channels and may encompass Frequency Division Multiple Access (FDMA) and/or Time Division Multiple Access (TDMA) and/or Code Division Multiple Access (CDMA) communications or combinations thereof. At a minimum, satellite 12 regularly transmits over one or more broadcast channels 18. ISUs 26 synchronize to broadcast channels 18 and monitor broadcast channels 18 to detect data messages which may be addressed to them. ISUs 26 may transmit messages to satellites 12 over one or more acquisition channels 19. Broadcast channels 18 and acquisition channels 19 are not dedicated to any one ISU 26 but are shared by all ISUs 26 currently within view of a satellite 12.

On the other hand, traffic channels 17 are two-way channels that are assigned to particular ISUs 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from an ISU 26 located at any point on or near the surface of the earth may be routed through the constellation of satellites 12 to within range of substantially any other point on the surface of the earth. A communication may be routed down to an ISU 26 on or near the surface of the earth from a satellite 12 using subscriber link 16. Alternatively, a communication may be routed down to or up from any of many ETs 24, of which FIG. 1 shows only two, through earth links 15. ETs 24 are usually distributed over the surface of the earth in accordance with geo-political boundaries. In the preferred embodiments, each satellite 12 may communicate with up to four ETs 24 and over a thousand ISUs 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communication systems, such as the PSTN, may access communication system 10 through GWs 22.

With the example constellation of sixty-six satellites 12, at least one of satellites 12 is within view of each point on the earth's surface at all times, resulting in full coverage of the earth's surface. Any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISUs 26, between SCS 28 and GW 22, between any two GWs 22 or between ISU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and ISU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
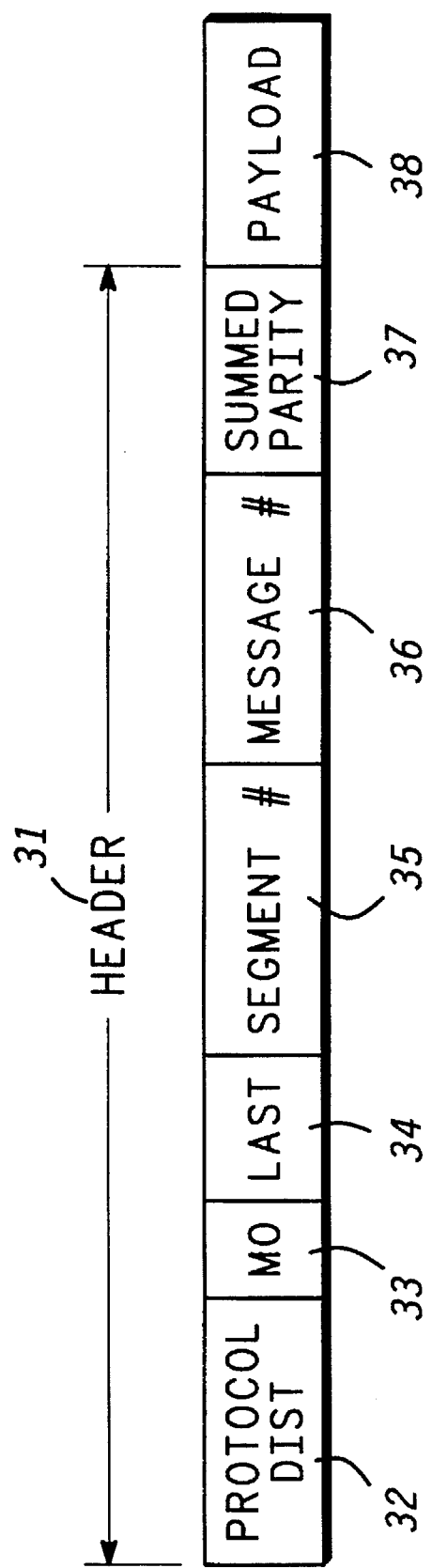
FIG. 2 shows fields of a segment in accordance with a preferred embodiment of the present invention.

A message comprises at least one segment. These segments may be transmitted individually through the constellation of satellites using any method of transmission, including the method described in *Inter-satellite Method for Routing Packets* which is incorporated by reference herein. Each segment is formatted according to the format shown in FIG. 2. FIG. 2 shows a segment or packet format in accordance with a preferred embodiment of the present invention. As shown in FIG. 2, segment 30 comprises header 31 and payload 38. Header 31 comprises PROTOCOL DIST 32, MO 33, LAST 34, SEGMENT No. 35, MESSAGE No. 36, and SUMMED PARITY 37.

PROTOCOL DIST 32 represents the protocol discriminator field and is used to determine whether higher layers of protocol are to be applied to the message 30. When this field is reset to zero, the method shown in FIG. 3 will be executed. This field is used to determine whether the method described in FIGS. 3 and 4 will be used for this message or some other undefined protocol. This field is not used to distinguish what higher layer to pass to, but rather to determine if this layer should use the method described herein or some another protocol.

MO 33 indicates whether the segments of a message may be delivered in the same order in which they were transmitted or if they are delivered without the order check. Messages are delivered to a higher protocol (within a layer of protocols), an application or whatever is making the request or receiving the payload message.

LAST 34 indicates whether the current segment is the last segment of a particular message. When the field is set to zero, this indicates that this segment is the last segment for a particular message and thus, it indicates how many segments were generated. LAST 34 does not necessarily mean that the segment is the last segment to be received for a particular message. When LAST 34 indicates the last ordered segment, the number of segments for the particular message is automatically indicated. For example, suppose LAST 34 is set equal to zero and SEGMENT No. 35 is set to five. Since LAST 34 is set to zero which indicates the last segment, the number provided in the SEGMENT No. 35 fields indicates the number of messages for the message. Since SEGMENT No. 35 was equal to five, by adding a one to this number indicates that there are six segments for this particular message. (SEGMENT No. 35 is zero-based or SEGMENT No. 35 is set to zero for the first segment of a message).

MESSAGE No. 36 is a sequential number that is used to identify the frame under reconstruction. Message No. 36 also helps to reorder the packets. The messages are delivered using this message number as an ordering mechanism. For example, message 1 is delivered followed by message 2, followed by message 3, etc.

SUMMED PARITY 37 determines whether the header contains any errors. The first three bytes are added in an eight-bit format and then are negated. This number is compared to the summed parity to determine the integrity of the header. If the values do not compare, the segment or packet is discarded.

PAYLOAD 38 holds the data that is being transmitted. The data is destined for PAYLOAD 38 is simply an extraction of the frame in payload size segments in a sequential order. The headers of all the segments are removed and the payloads are placed in sequential order to reconstruct or reassemble the segmented message.

Those of ordinary skill in the art will appreciate that the size of the fields in the header and payload can be any size. Moreover, the fields of the header may also be arranged in any order.

Figure 3:
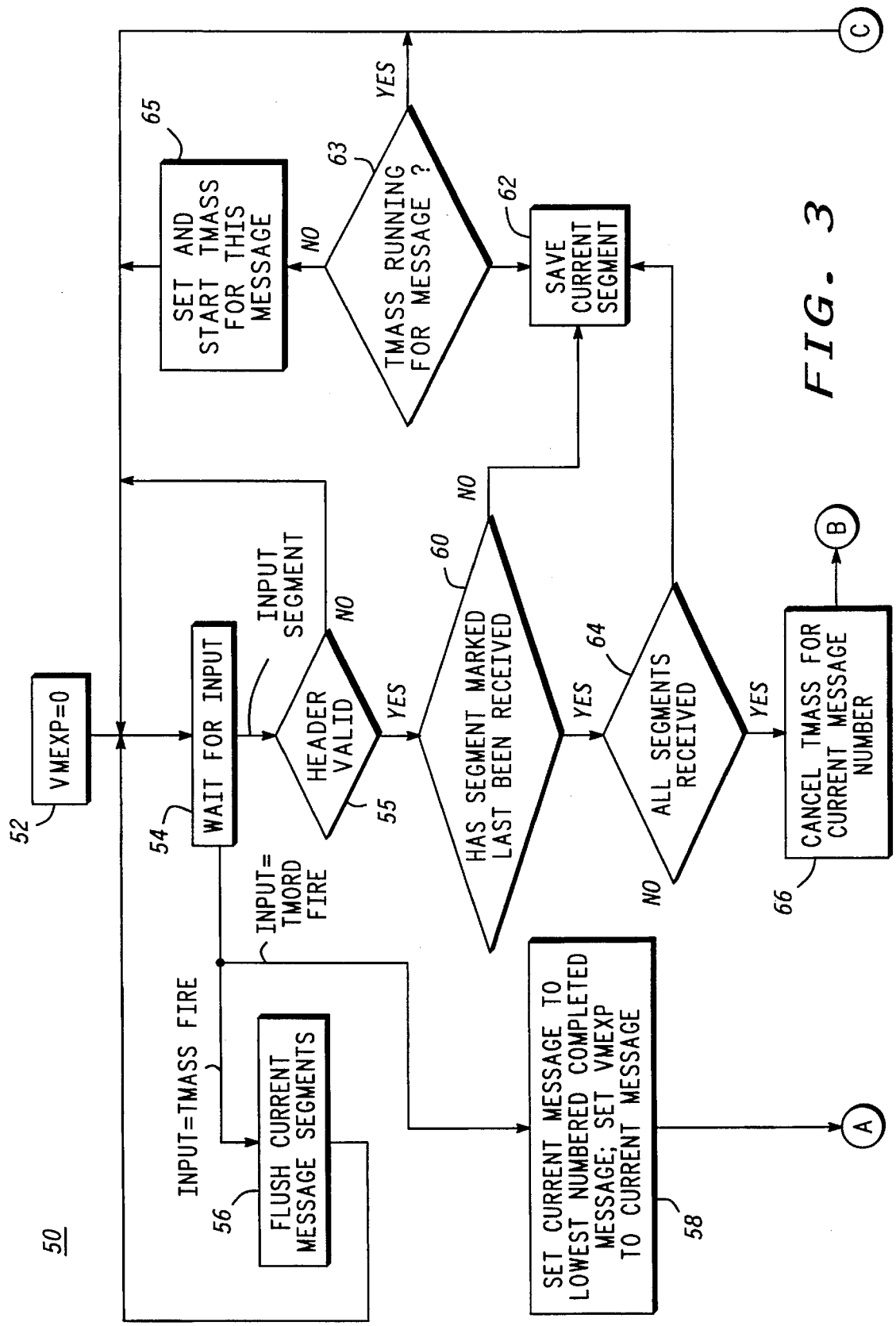
FIGS. 3 and 4 show a flowchart of a method for reconstructing and delivering segmented messages in accordance with a preferred embodiment of the present invention.
Figure 4:
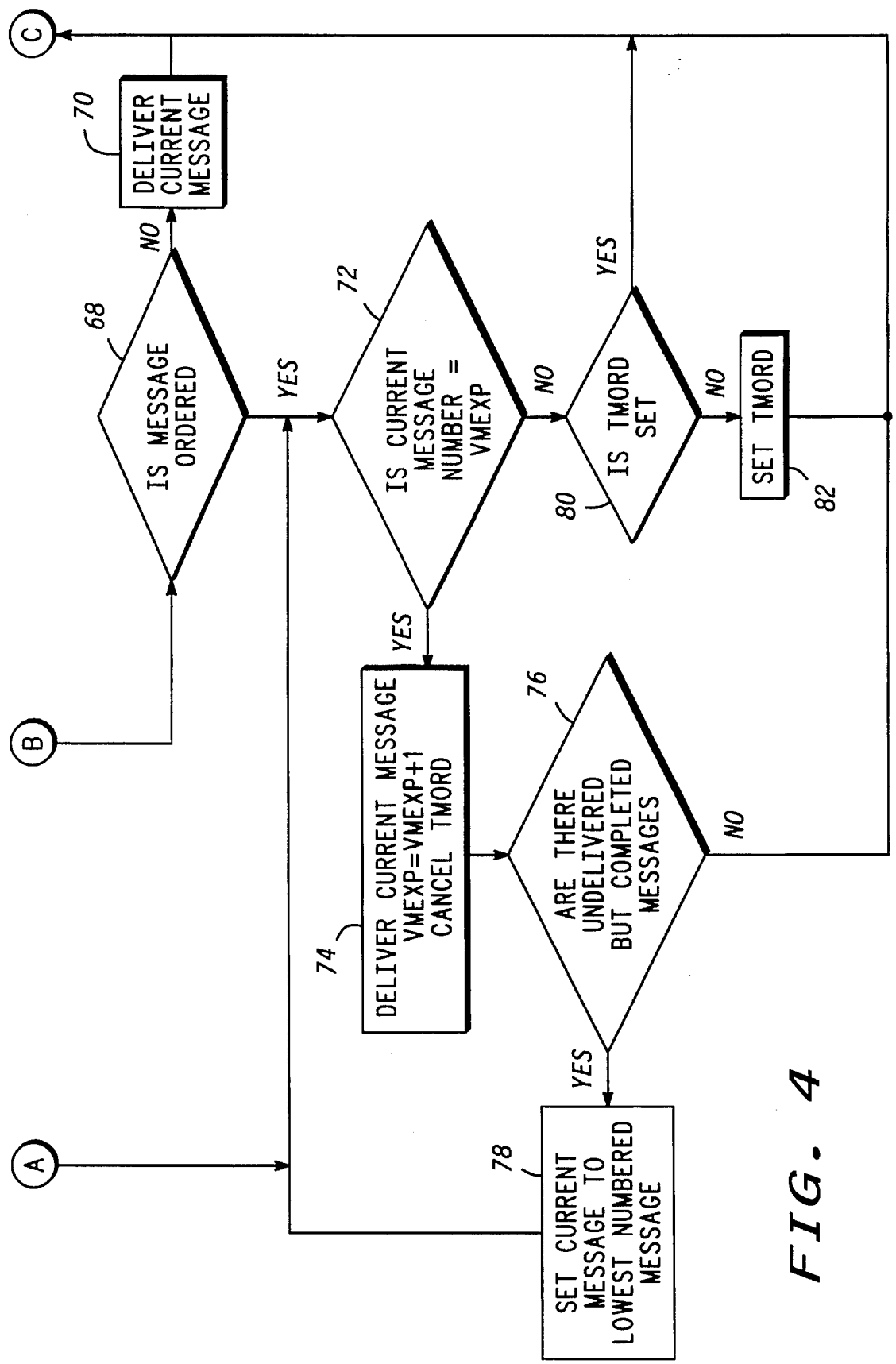

FIGS. 3 and 4 show a flowchart of a method 50 for reconstructing and delivering segmented messages in accordance with a preferred embodiment of the present invention. First, method 50 initializes in step 52 the expected message number (Vmexp) to zero. This step indicates that the first message expected to be received has MESSAGE No. 36 (from FIG. 2) set to zero.

Method 50 waits in step 54 for input. The input may be a segment or events or stimuli generated by outside entities, such as timers. Segments are transmitted and received using any method or protocol, including the method described in *Inter-satellite Method for Routing Packets*, for example. The mechanism for transmission or receipt of a segment is not important. Input may comprise "Tmass fire", "Tmord fire" or a segment of a message. Timer fires (or timed-out events) are generated by some type of operating system command. "Tmass fire" and "Tmord fire" are discussed in greater detail below in relation to steps 56 and 58, respectively.

If the input is a segment 30, method 50 determines whether the header is valid by adding the first three bytes in an eight-bit format and then negating the sum. This number is compared to the summed parity to determine the integrity of the header. If the values do not compare, the segment or packet is discarded and method 50 returns to step 54 to wait for input.

If the header is valid, method 50 determines in step 60 whether the received segment is identified to be the last segment of a message by checking the LAST 34 field. LAST 34 does not necessarily mean that the segment is the last segment to be received for a particular message. If LAST 34 indicates that this segment is not marked as last for a particular message, method 50 in step 62 then saves the current segment and then determines in step 63 whether the message assembly timer (Tmass) associated with the current message being reconstructed is running. There is one message assembly timer for each message being reconstructed or reassembled. If Tmass is not running for the current message, it is set and started in step 65, and method 50 return to step 54 to wait for input. If Tmass is running for the current message as determined in step 63, method 50 returns to step 54 to wait for input.

If method 50 receives "Tmass fire" as input, method 50 flushes in step 56 the segments of the message for which the timer was associated. In other words, all the buffers containing segments received previously for a particular message are cleared or flushed when the message assembly timer times out because the other segments are lost somewhere on the network. The message assembly timer prevents system overload of messages which are incomplete.

If LAST 34 indicates that this segment is the last segment for a particular message in step 60, method 50 determines in step 64 whether all the segments for the message have been received. As explained above, the combination of LAST 34 and the SEGMENT No. 35 indicates how many segments comprise a particular message. From this information, method 50 knows how many segments comprise the message and checks to see if all the segments have been received. If method 50 determines that all the segments for a specific message have not been received, then method 50 saves in step 62 the current segment (which is the last segment of the message). Moreover, method 50 sets in step 62 the message assembly timer associated with the message if it is not already set and the message assembly timer begins counting down.

If all the segments of a message have been received in step 64, method 50 cancels the message assembly timer for the current message in step 66. Next, as shown in FIG. 4, method 50 determines whether the message is ordered or unordered by checking MO 33 (of FIG. 2) in step 68. If the message is unordered, method 50 delivers in step 70 (shown in FIG. 4) each of the segments associated with the particular message. Method 50 reconstructs the message by removing the header from each segment and reordering the segments based on Segment No. 35. The message is reconstructed by appending the payloads of each of the segments in a single buffer. Only the payloads of each segment are delivered. As discussed above, messages are delivered to higher layers of protocols, applications or whatever requested the message or was suppose to receive the message.

As shown in FIG. 4, if method 50 determines that the message is ordered in step 68, method 50 next determines in step 72 whether the current message number (as indicated from MESSAGE No. field 36) is equal to the expected message number Vmexp. If MESSAGE No. 36 matches Vmexp, method 50 in step 74 delivers the current message, increments the expected message number Vmexp and cancels message reordering timer Tmord for the delivered message. Message reordering timer Tmord is explained in greater detail below in relation to steps 80 and 82. The expected message number Vmexp now indicates that the next message is ready to be delivered. Method 50 proceeds to check in step 76 whether there are any undelivered messages for which all the segments have been received. For example, suppose messages 1 and 2 each has three segments. Further suppose that the three segments of message 2 are received before message 1. Once all the segments for message 1 have been received and delivered (unless the message assembly timer times out for message 1), message 2 is ready to be delivered because all the segments have been received. Thus, step 76 is checking for messages like message 2 in which all the segments have been received and are ready to be delivered.

If there are completed messages which are waiting to be delivered, then the lowest numbered of these message is examined. If method 50 determines in step 78 that the expected message number Vmexp (which was incremented in step 74) had received all of its segments, method 50 then sets the current message to the lowest numbered message in step 78. Method 50 returns to step 72 to find whether the next message is ready to be delivered by comparing the updated current message number to the expected message number Vmexp. This sequence of steps ensures that a message which has received all of its segments is not delivered before a lower-numbered message which has not received all of its segments. If there are no messages in which all the segments have been received, method 50 returns to step 54 to wait for input.

Returning to step 72 of FIG. 4, if method 50 determines that the current message number is not equal to the expected message number Vmexp, method 50 checks in step 80 whether the message reordering timer is set. Message reordering timer indicates whether to continue to wait for a message which may never arrive. If message reordering timer Tmord is set, method 50 returns to step 54 to wait for input. Otherwise, method 50 sets message reordering timer Tmord in step 82 and returns to step 54 to wait for additional input.

If the input indicates that the message reordering timer Tmord has timed out in step 54, method 50 sets in step 58 the current message to the message which has the lowest number and where all of the segments have been received. Method 50 also sets in step 58 the expected message number Vmexp to the current message. Method 50 then goes to step 72 and proceeds through the other steps until waiting for input in step 54.

It will be appreciated by those skilled in the art that the present invention allows for efficient reconstruction and delivery of messages through a constellation of nodes (i.e., satellites). The method is straightforward, simple and allows for simultaneous delivery of both ordered and unordered message through a constellation of satellites which may not preserve transmission order of packets. Moreover, the method has the advantages of message sequencing and provides adaptation for a large message format protocol to be transmitted via a small fixed-sized delivery mechanism.

Accordingly, it is intended by the appended claims to cover all modifications of the invention which fall within the true spirit and scope of the invention.

What is claimed is:

1. A method for reconstructing messages from at least one of a plurality of segments, an expected message number being initially set to a predetermined value, each segment having a message number and an ordered check field, the method comprising the steps of:

a) receiving a segment for one of a plurality of messages;

b) repeating step (a) until all segments are received for a message;

c) reconstructing the message from the received segments associated with the message;

d) delivering the message if all segments are received and the order check field indicates that the message is to be delivered in non-sequential order; and e) delivering the message if all segments are received and the message number of the message is equal to the expected message number and the order check field indicates the message is to be delivered in sequential order.

2. A method as recited in claim 1, further comprising the steps:

f) increasing the expected message number;

g) delivering another of the messages if all segments are received for the another of the messages and the message number of the message is equal to the expected message number; and h) repeating steps (f) and (g) until all of the messages are delivered.

3. A method as recited in claim 1, wherein each segment includes a header, and wherein step (b) comprises the steps of:

b1) checking the header for any errors; and b2) discarding the segment if the header as any errors.

4. A method as recited in claim 1, wherein step (b) comprises the steps of:

b1) saving the segment; and b2) initializing and starting a message assembly timer when the message assembly timer was not previously started for the message assembly timer associated with the message.

5. A method as recited in claim 4, wherein step (b) further comprises the step of stopping the message assembly timer if all segments are received for the message.

6. A method as recited in claim 4, further comprising the steps of:

b3) receiving notice that a message assembly timer expired; and b4) flushing the segments associated with the message assembly timer.

7. A method as recited in claim 1, wherein step (b) comprises the steps of:

b1) determining whether the segment is marked last; and b2) saving the segment if the segment is not marked last.

8. A method as recited in claim 7, wherein each segment has a segment number, and wherein step (b) further comprises the step of determining how many segments there are for the message based on the segment number when the segment is marked last.

9. A method as recited in claim 1, further comprising the steps of:

f) initializing and starting a message reordering timer if the message number is not equal to the expected message number and the message reordering timer was not previously initialized; and g) setting expected message number to message number of the message if the message reordering timer expires.

10. A method as recited in claim 1, wherein each segment has a segment number and payload, and wherein step (c) comprises the step of reassembling the payload of each segment in the order dictated by the segment number.

11. A method for reconstructing messages from at least one of a plurality of segments, an expected message number being initially set to a predetermined value, each segment including a message number and an ordered check field, a segment number and a payload, the method comprising the steps of:

a) receiving a segment for one of a plurality of messages;

b) repeating step (a) until all segments are received for a message;

c) reassembling the payload of each segment in the order dictated by the segment number;

d) delivering the message if all segments are received and the order check field indicates that the message is to be delivered in non-sequential order;

e) delivering the message if all segments are received and the message number of the message is equal to the expected message number and the order check field indicates the message is to be delivered in sequential order;

f) increasing the expected message number;

g) delivering another of the messages if all segments are received for the another of the messages and the message number of the another of the messages is equal to the expected message number and the order check field indicates the another of the messages is to be delivered in sequential order; and h) repeating steps (f) and (g) until all of the messages are delivered.

* * * * *